United States Patent
Eschbach et al.

(10) Patent No.: US 7,791,752 B2
(45) Date of Patent: Sep. 7, 2010

(54) DYNAMIC OFFER GENERATION BASED ON PRINT SHOP MACHINE LOAD

(75) Inventors: Reiner Eschbach, Webster, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1065 days.

(21) Appl. No.: 11/343,332

(22) Filed: Jan. 31, 2006

(65) Prior Publication Data
US 2007/0177191 A1 Aug. 2, 2007

(51) Int. Cl.
*G06F 3/12* (2006.01)
(52) U.S. Cl. .................. 358/1.15; 358/1.1; 358/402; 705/10; 705/20; 705/26; 705/14.29; 705/14.39
(58) Field of Classification Search ................ None
See application file for complete search history.

(56) References Cited

U.S. PATENT DOCUMENTS

| | | | | |
|---|---|---|---|---|
| 4,839,829 | A * | 6/1989 | Freedman | 715/751 |
| 6,330,542 | B1 * | 12/2001 | Sevcik et al. | 705/8 |
| 6,581,316 | B2 * | 6/2003 | Forsythe et al. | 40/657 |
| 6,801,333 | B1 * | 10/2004 | Weiss | 358/1.15 |
| 6,981,015 | B1 * | 12/2005 | Palmer et al. | 709/201 |
| 7,027,175 | B2 * | 4/2006 | Robertson | 358/1.15 |
| 7,076,450 | B1 * | 7/2006 | Lopez, Jr. | 705/26 |
| 7,080,030 | B2 * | 7/2006 | Eglen et al. | 705/26 |
| 7,139,086 | B1 * | 11/2006 | Whitmarsh et al. | 358/1.15 |
| 7,143,056 | B1 * | 11/2006 | Lopez, Jr. | 705/26 |
| 7,149,709 | B1 * | 12/2006 | Lopez, Jr. | 705/26 |
| 7,225,220 | B2 * | 5/2007 | Gonzalez et al. | 709/202 |
| 7,242,490 | B1 * | 7/2007 | Palmer et al. | 358/1.15 |
| 7,330,839 | B2 * | 2/2008 | Srinivasan et al. | 705/400 |
| 7,570,376 | B2 * | 8/2009 | Wiechers | 358/1.13 |
| 7,620,569 | B2 * | 11/2009 | Chiarabini et al. | 705/26 |
| 2002/0026379 | A1 * | 2/2002 | Chiarabini et al. | 705/26 |

(Continued)

OTHER PUBLICATIONS

Mimeo.com internet website printout (printed Dec. 21, 2005).

*Primary Examiner*—Mark K Zimmerman
*Assistant Examiner*—Dung D Tran
(74) *Attorney, Agent, or Firm*—Fay Sharpe LLP

(57) ABSTRACT

A variable price on-line printing system includes printing and finishing resources, and an on-line server to receive print job data and electronic requests for use of the printing/finishing resources from customer workstations. A dynamic price database includes data that describe current and anticipated future demand for the printing/finishing resources. An automated dynamic price offer generation process accesses the dynamic price database and derives a dynamic price for use of at least one of the printing/finishing resources based upon current and anticipated future demand as indicated in the dynamic price database. A user interface engine receives input from the automated dynamic price offer generation process and outputs price offers to the customer workstations, including the dynamic price associated with a printing/finishing resource, wherein the dynamic price is tailored to shape demand for the printing/finishing resource. The customer can accept or decline the dynamic price offer. In this manner, under-utilized printing/finishing resources, including turn-around options, are priced more attractively as compared to over-utilized printing/finishing resources to increase customer demand based upon real-time load/utilization/availability data for the printing/finishing resources of the on-line print shop. The printing/finishing resources can be geographically dispersed print shops of a printing enterprise, or certain resources of same.

2 Claims, 6 Drawing Sheets

U.S. PATENT DOCUMENTS

2002/0035538 A1* 3/2002 Moreau .................... 705/39
2002/0046129 A1* 4/2002 Nakagawa ................ 705/26
2003/0046171 A1* 3/2003 Whale ...................... 705/26
2003/0140315 A1* 7/2003 Blumberg et al. .......... 715/527

* cited by examiner

FIG. 5A
(PRIOR ART)

Binding:
- ● Spiral     € 2.50
- ○ 3/Ring Binder     € 1.75
- ○ Perfect Bound     € 3.25

W20

Binding:
- ● Spiral     € 2.50
- ○ 3/Ring Binder     € 1.75
- ○ Perfect Bound     € 3.25

W20

Perfect Bound Special

Upgrade at the Special Offer Price of € 2.75 A 50cent Savings!

[YES] [NO]

Job Turn-Around Options:

- ⦿ Standard (3-5 Days)
- ○ Expedited (2 Days)
- ○ Urgent (24 Hours)

W40

Turn-Around Special

Choose Standard Turn-Around and receive a 10% discount on your entire order.

[YES] [NO, Thanks.]

W400

DYNAMIC OFFER GENERATION BASED ON PRINT SHOP MACHINE LOAD

BACKGROUND

Print jobs can be ordered on-line, using a web browser user interface or the like, giving the user the ability to see a representation of the final printed product. The user uploads the document data, e.g., cover page, text, tables and graphs, etc., and uses the on-line interface at a personal computer or other workstation to arrange the print job data and to select the print job parameters such as paper size, paper quality, color, binding, finishing, turn-around time, etc. Accordingly, the print shop capabilities, in terms of the available printing/finishing options just mentioned and others, are encapsulated in the on-line system and, based upon customer input, a realistic representation of the final printed product can be obtained, along with a per document and total cost and turn-around time. It is the implied hope of the print shop that the customer will see and select different print and/or finishing options and thus order a higher value document, or that a customer with a print job deemed over budget will still complete the transaction by selecting lower-cost printing/finishing/turn-around options instead of terminating the transaction.

Known systems for on-line print job ordering rely upon a static price model. The printing/finishing options have a set price that does not vary depending upon the actual real-world load/usage/backlog conditions for the printing/finishing resources at the print shop. Thus, for example, with a current state-of-the-art system, a user can choose to use color for $1 per page or black-and-white for $0.07 per page, and these price choices are presented to and apply for the user even if the black-and-white printing system is over-burdened while the color system is running at a fraction of its rated capacity. In current systems, print job turn-around cost parameters are also not adjusted in real time based upon print shop load, anticipated machine downtime. Thus, for example, the price for a 24-hour turnaround is not adjusted upward or downward to discourage or encourage use of the 24-hour turn-around service depending upon the print shop load, maintenance schedules, etc.

SUMMARY

In accordance with the present development, a print job ordering process comprises: receiving an electronic on-line print job request comprising print job data from a customer workstation; accessing a dynamic price database to determine resource load data for at least one resource of a printing/finishing system; deriving a dynamic price for at least one dynamically-priced printing/finishing option of the printing/finishing system that differs from a default price for the at least one dynamically-priced printing/finishing option based upon the resource load data in the dynamic price database; outputting a dynamic price offer of the at least one dynamically-priced printing/finishing option and the associated dynamic price to the customer workstation; receiving printing/finishing input from the customer workstation indicating acceptance or denial of the dynamic price offer; fulfilling the electronic on-line print job request using the printing/finishing system in accordance with the printing/finishing input received from the customer workstation.

In accordance with another aspect of the present development, a variable price on-line printing system comprises: printing and finishing resources; an on-line server to receive print job data and electronic requests for use of the printing/finishing resources from customer workstations; a dynamic price database comprising data that describe current and anticipated future demand for the printing/finishing resources; an automated dynamic price offer generation process system for accessing the dynamic price database and deriving a dynamic price for use of at least one of the printing/finishing resources based upon the current and anticipated future demand as indicated in the dynamic price database for the at least one printing/finishing resource; a user interface engine that receives input from the automated dynamic price offer generation process and that outputs price offers to the customer workstations, wherein the price offers output by said user interface engine include the dynamic price associated with the at least one printing/finishing resource.

In accordance with another aspect of the present development, a variable price on-line printing method comprises: receiving an on-line print job request and data defining said print job from a customer workstation, wherein said on-line print job request specifies use of a first resource of a printing/finishing system; identifying a second resource of the printing/finishing system that is an alternative to said first resource and that is currently being used at a sub-optimal capacity as compared to the first resource; deriving a dynamic price that differs from a default price for the second resource, wherein the dynamic price alters customer demand for the second resource as an alternative to the first resource; outputting the dynamic price to the customer workstation in association with an offer to use the second resource of the printing/finishing system as an alternative to the first resource; receiving input from the customer workstation that indicates acceptance or denial of the dynamic price offer for use of the second resource of the printing/finishing system.

BRIEF DESCRIPTION OF THE DRAWINGS

The present development comprises various components and arrangements of components and various steps and arrangements of steps, preferred embodiments of which are illustrated in the drawings, wherein:

FIG. 5A (prior art) illustrates an example of a conventional fixed price user interface for a print job finishing option;

FIG. 5B shows an example of a dynamic price user interface for a print job finishing option in accordance with the present development;

FIG. 6 illustrates an example of a dynamic price user interface for print job turn-around in accordance with the present development.

DETAILED DESCRIPTION

Figure 1:
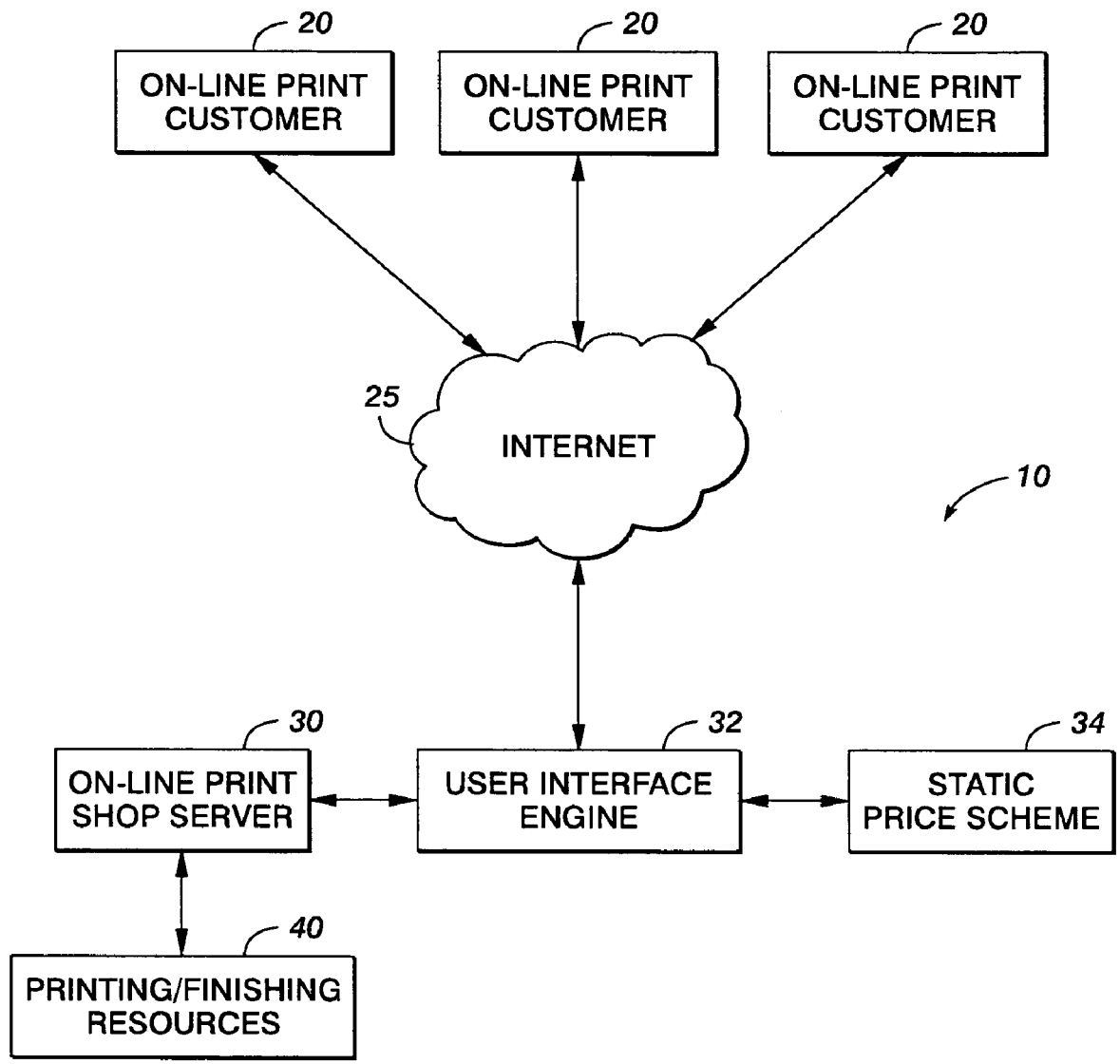
FIG. 1 (prior art) schematically illustrates a conventional static price on-line print shop.

FIG. 1 illustrates a conventional on-line print shop order model 10. One or more on-line print customer computer workstations 20 connect via the internet or other computer network 25 with the on-line print job server computer system 30, in particular, a user interface engine 32 thereof. The customer workstations 20 upload print data and print parameters, payment information, etc. to the print job server 30, in order to request use of the printing/finishing resources 40 to complete a print job to generate hard copy output materials. The customer workstations 20 also receive data such as printing/finishing options and pricing, representations of the final print job including the selected printing/finishing options, etc. from the print job server 30 through the computer network 25. The input/output to/from the customer workstations 20 is typically carried out by a browser-based graphical user interface (GUI) created and managed by the user interface engine 32 as is generally known in the art.

Figure 2:
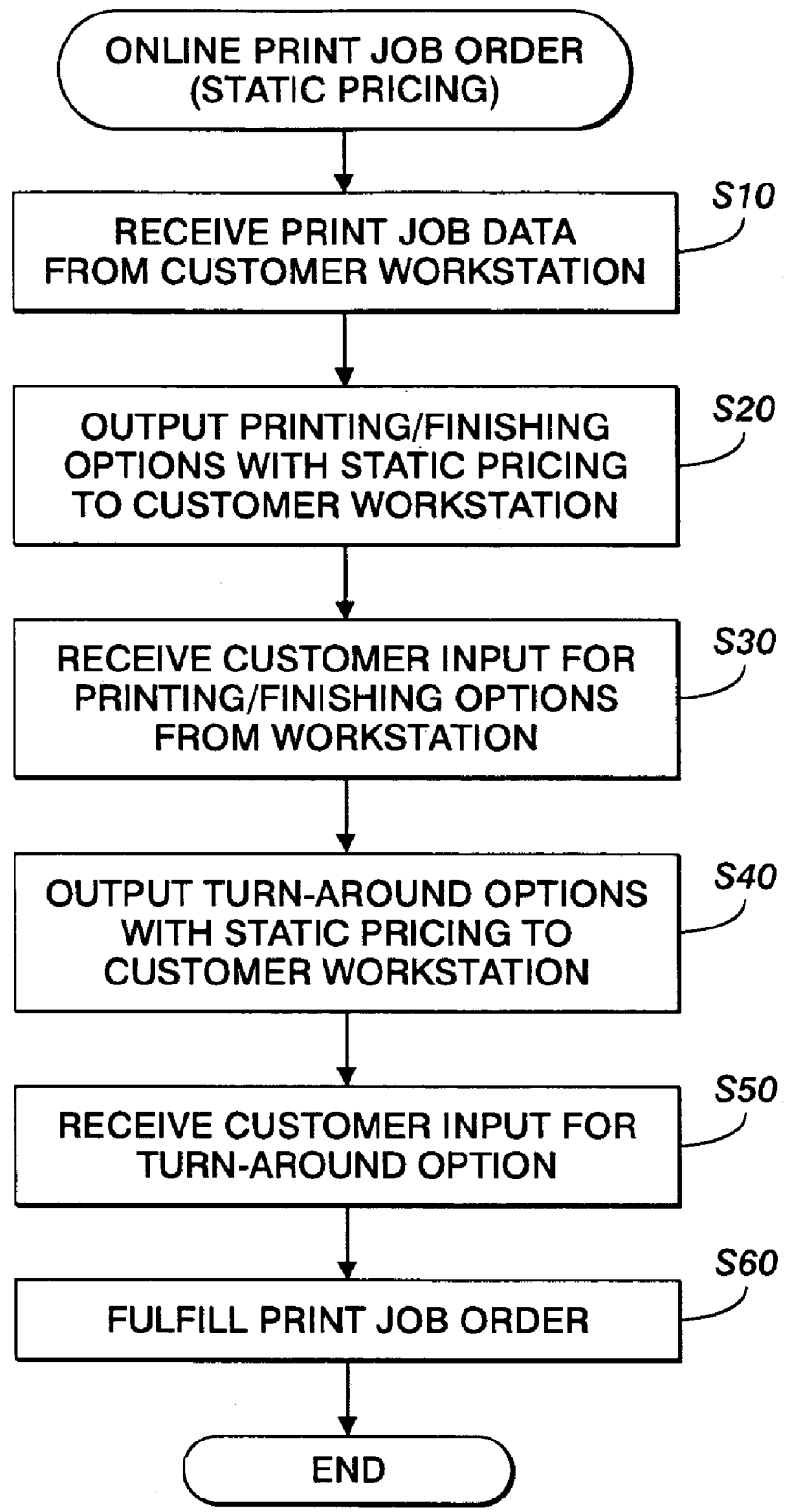
FIG. 2 (prior art) discloses a conventional on-line print job order process using the static price on-line print shop of FIG. 1.

The on-line print job server 30 implements a static pricing scheme 34 which includes set prices for printing/finishing resources 40 (e.g., paper quality, color output, black-and-white output, binding, tab separators, drilled paper, etc.) according to periodic input provided by the human management of the system 10 in order to determine a price for the print job uploaded from a customer workstation 20. Thus, for example, every quarter or month or as otherwise deemed necessary, but always without regard to the real-time load on the printing/finishing resources 40, the human management of the system 10 will update the static price scheme 34 to reflect increased/decreased costs, increased/decreased profit margins, increased/decreased competition, etc., and these static prices are presented to the customer workstations 20 via the user interface engine 32. The print job request of the on-line print customer 20 is fulfilled using the printing and finishing resources 40 according to the static price scheme 34, without regard to any real-time adjustment of the static price scheme to reflect current demand for the various print and/or finishing resources 40. FIG. 2 provides a flow chart of a typically on-line print job order process using the static price model of FIG. 1.

In a step S10, print job data are received from a customer at the print job server 30 from a customer workstation 20.

In a step S20, print and finishing options are output to the customer via user interface. engine 32 for display on the customer workstation 20, using prices obtained from the static price scheme 34 implemented by the print job server 30. One example is shown in FIG. 5A, wherein a binding option window W20 is presented to a user at his/her workstation 20 according the user interface engine 32. It can be seen that the binding option window W20 sets forth three different print job binding options and three fixed prices obtained from the static price scheme 34 and associated respectively with the various options so that a user can select the desired binding option.

In a step S30, the print job server 30 receives customer input from a customer workstation 20 via user interface engine 32 for the desired print and finishing options, i.e., which printing and/or finishing resources 40 are desired by the customer.

In a step S40, print job turn-around options are output to the customer for display on the customer workstation 20, also using static pricing according to the static price scheme 34 without regard to real-time or predicted backlog data for the printing/finishing resources 40.

In a step S50, the print job server 30 receives customer input from a customer workstation 20 for the desired turn-around option, and the print job request is fulfilled in a step S60 accordingly using the required printing and/or finishing resources 40.

Figure 3:
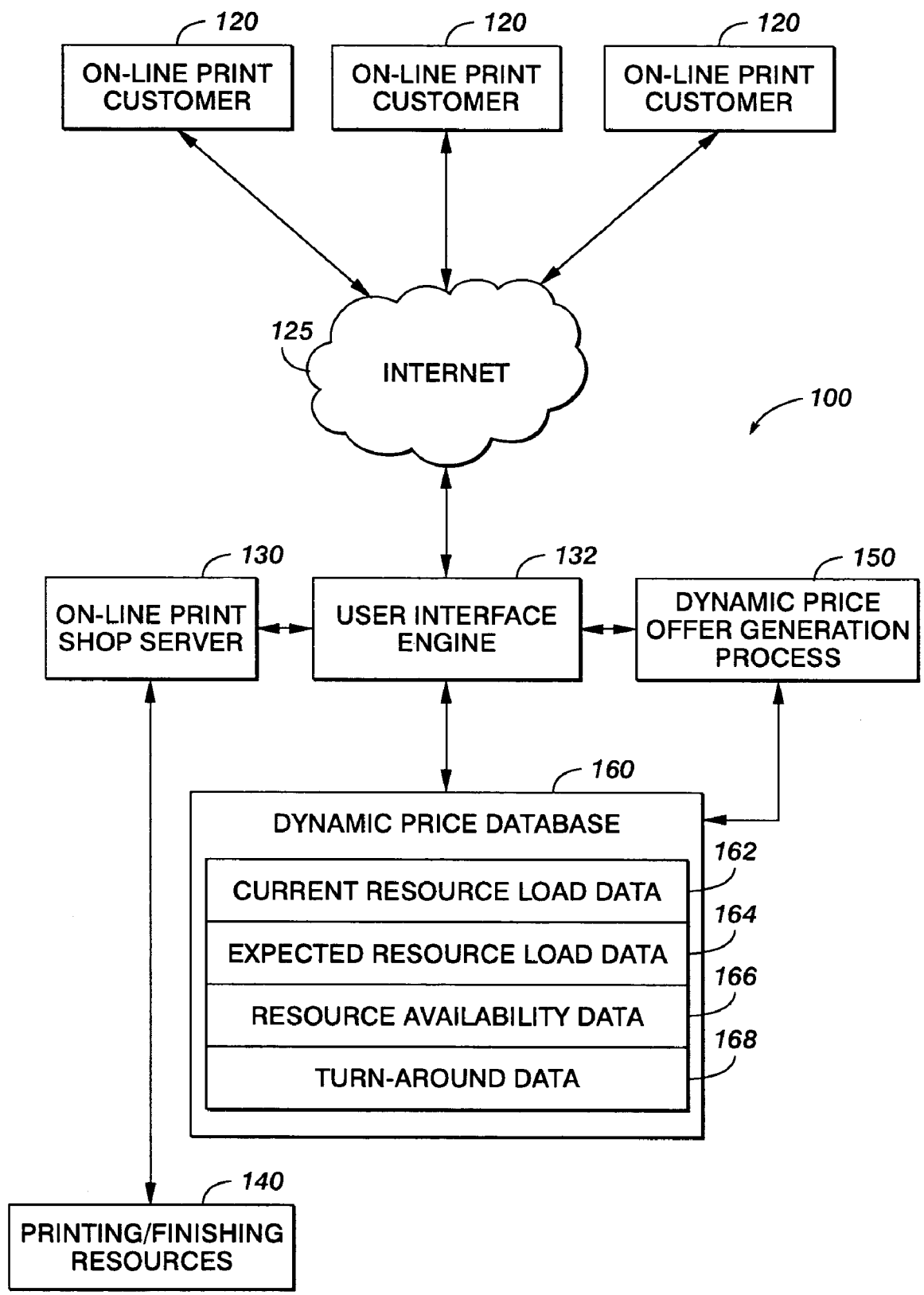
FIG. 3 schematically illustrates a dynamic price on-line print shop in accordance with the present development.

FIG. 3 illustrates a dynamic price on-line print shop system 100 in accordance with the present development. As with the conventional system 10 (FIG. 1), one or more on-line print customer computer workstations 120 connect via the internet or other computer network 125 with the on-line print job server computer system 130, in particular, a user interface engine 132 thereof. The customer workstations 120 upload print data and print parameters, payment information, etc. to the print job server 130, and receive data such as printing/finishing options and pricing, representations of the final print job including the selected printing/finishing options, etc. from the print job server 130 through the computer network 125, typically using a browser-based graphical user interface (GUI) driven by the user interface engine 132.

Unlike the conventional system 10 shown in FIG. 1, the dynamic system 100 of FIG. 3 implements an automated dynamic price offer generation process 150 in the print job server 130. The dynamic price offer generation process 150 derives a specialized dynamic price for one or more printing/finishing resources 140 (e.g., paper quality, color output, black-and-white output, binding, tab separators, drilled paper, etc.), based upon real-time and/or predicted future load conditions of the printing and finishing resources 140. In particular, the dynamic price offer generation process 150 comprises an automated algorithm that lowers the default price of printing/finishing options (or the print job overall) for printing/finishing options that will encourage use of printing/finishing resources 140 that are under-utilized, i.e., that are running below maximum rated capacity. Alternatively, the dynamic price offer generation process 150 can increase the price of printing/finishing options that require use of resources 140 that are over-utilized or that have an excessive backlog or that are due for scheduled down-time, in order to discourage demand for such printing/finishing resources 140 and drive demand to alternative resources 140 that are under-utilized. The print job server 130 thus implements a dynamic price database 160 comprising current printing resource load data 162 defining the current utilization rate for each print/finishing resource 140 (e.g., the number of pages currently being handled by the resource), expected resource load data 164 defining the expected future utilization rate for each print/finishing resource 140 (e.g., the number of pages in a backlog queue for the resource), resource availability data 166 defining current and anticipated downtime for repair/maintenance/upgrade or the like for printing/finishing resources 140, and turn-around data 168 defining current and expected turn-around capabilities and backlogs.

The dynamic offer generation process 150 periodically accesses the dynamic price database 160 and identifies printing/finishing resources 140 that are currently over-utilized or under-utilized. This access of the dynamic price database 160 by the dynamic offer generation process 150 occurs for each print job that is submitted from a customer workstation 120 or, alternatively, can occur periodically based upon a time interval or number of print jobs submitted. For example, if the current printing resource load data 162 indicates that the color print engine is currently under-utilized in terms of pages to be printed relative to the black-and-white print engine, the dynamic offer generation process 150 will identify this imbalance and will implement a real-time dynamic price adjustment of the color print engine resource in order to drive demand to the color print engine from the black-and-white print engine, e.g., a "20% off" color sale price. Alternatively, the dynamic offer generation process can increase the price for use of the black-and-white print engine, to discourage use of same in favor to the color print engine.

As shown, the dynamic offer generation process 150 provides input to the user interface engine 132 so that the dynamic prices derived by the dynamic offer generation process 150 are output to the customer workstation(s) 120 for display and possible acceptance by a user. In a similar manner, the dynamic offer generation process 150 accesses the turn-around data 168 of database 160 and identifies over-utilized or under-utilized turn-around options based upon previous print orders submitted from customer workstations 120 and also based upon the printing/finishing resources 140 that are currently and/or expected to be over-utilized or under-utilized For example, if the turn-around data 168 indicate that very few customers have selected an "urgent " 24-hour turn-around, and if the printing/finishing resource data 162,164, 166 indicate that resource capacity is available in the next 24 hour period, the dynamic price offer generation process 150 will derive a dynamic price for the "urgent" 24-hour turn-around option and the user interface engine 132 will present same to one or more users via workstations 120, to increase demand for the "urgent" 24-hour turn-around option. It should be noted by those of ordinary skill in the art that the dynamic offer generation process 150 also comprises the above-described static price scheme 34 so that, in the absence of any need to adjust prices, a default static price, as set periodically by human management, is set for the printing/finishing/turn-around option, i.e., in some cases the dynamic price offer generation process 150 will find no need to derive a dynamic price that differs from the default price. This can be the case, for example, if the dynamic system 150 does not find a bottleneck, i.e.: none of the printing/finishing devices 140 is at a load level considered too high, or if all applicable devices have a low load level.

Figure 4:
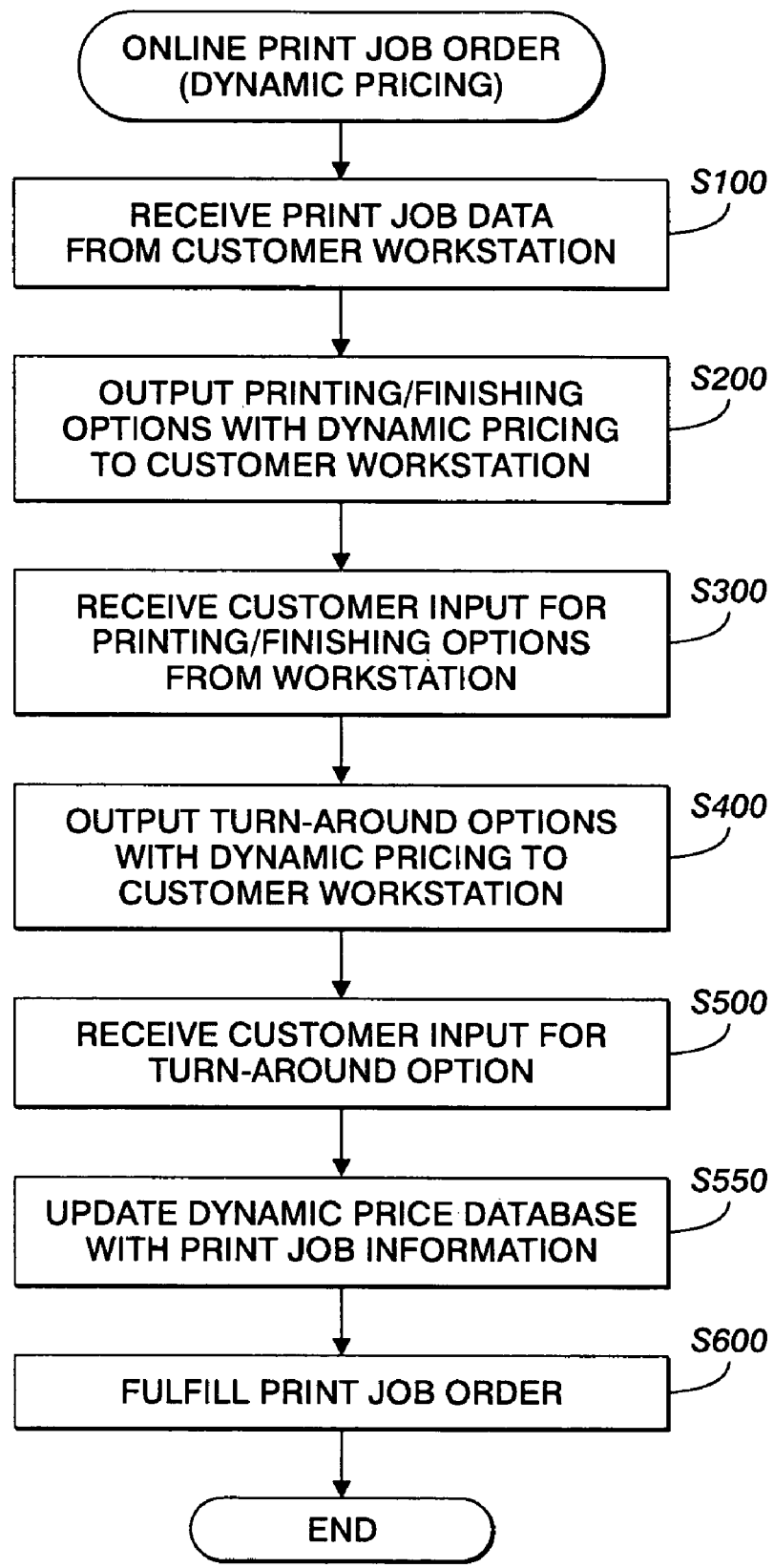
FIG. 4 discloses a dynamic price print job order process using the dynamic price on-line print shop shown in FIG. 3.

In either case, after each print job submitted from a customer workstation 120, the dynamic price database 160 is updated to reflect new demand on the printing/finishing resources 140 and the turn-around option selected. The print job submitted from a workstation 120 is then fulfilled using the required printing/finishing resources 140 and mailed or otherwise delivered to the user according to the selected turn-around option. FIG. 4 discloses an on-line print job ordering process using the dynamic system 100 of FIG. 3.

In a step S100, print job data are received from a customer at the print job server 130 from a customer workstation 120.

In a step S200, printing/finishing options are output to the customer via user interface engine 132 for display on the customer workstation 120, using dynamic prices obtained from the dynamic price offer generation process 150. FIG. 5B illustrates one example for implementing the step S200. There, it can be seen that the user is presented with the static price window W20 described above, and also presented with a pop-up dynamic price window W200 offering a special dynamic (discounted) price for the perfect bound option. The user at a workstation 120 can accept or decline the dynamic price offer set forth in the dynamic price window W200. The display of a pop-up dynamic price window W200, together with the static or default price window W20, facilitates comparison of the default and dynamic prices by the customer on the workstation 120.

In a step S300, the print job server 130 receives customer input from a customer workstation 120 via user interface engine 132 for the desired printing/finishing options, i.e., which printing/finishing resources 140 are desired by the customer.

In a step S400, print job turn-around options are output to the customer for display on the customer workstation 120, using dynamic pricing derived and output by the dynamic price offer generation process 150. An example implementation of the step S400 is shown in FIG. 6. There, it can be seen that a user workstation 120 is driven by the user interface engine 132 to present not only a conventional static price window W40 including various turn-around options and the associated static price for each, but also a dynamic price pop-up window W400, describing a special offer for one or more turn-around options in an effort to shape the user's demand for a particular turn-around option. The display of a pop-up dynamic price window W400, together with the static or default price window W40 facilitates comparison of the default and dynamic prices by the customer on the workstation 120. In the present example, the dynamic price offer generation process 150 has accessed the dynamic price database 160, in particular the turn-around data 168 thereof, and determined a need to drive user demand from the "urgent" 24-hour and "expedited" turn-around options to the slower "standard" turn-around option to prevent over-loading of printing/finishing resources 140, e.g., based upon excessive demand for the "urgent" 24-hour and "expedited" turn-around options and/or because of scheduled maintenance during the next 2 days. As such, the dynamic price window W400 presents a 10% order discount offer to the user at the workstation 120 to encourage selection of the standard turn-around option. Alternatively, the dynamic price offer generation process 150 derives a reduced-price for one or more of the particular turn-around selections. In general, the dynamic price offer generation process identifies one of the plurality of different possible turn-around options that is under-utilized relative to the current and anticipated load of the printing/finishing resources 140, and derives a price for the identified turn-around option that will increase demand for same.

In a step S500, the print job server 30 receives customer input from a customer workstation 120 for the desired turn-around option.

In a step S550, the user interface engine 132 extracts the input submitted from the customer workstations 120 and updates the dynamic price database 160 based upon the printing/finishing resources 140 and turn-around option selected by the user for the submitted print job.

The print job request is fulfilled in a step S600 accordingly using the required printing and/or-fishing resources 140 to meet the requested turn-around time.

Those of ordinary skill in the art will recognize from the foregoing that the present development provides for dynamic inclusion of the status of the printing/finishing resources 140 with respect to machine availability and load to dynamically affect pricing. In this way, costly idle time of the printing/finishing resources 140 can be reduced by customer targeted offer modifications, steering a higher workload to under-utilized machines and vice versa.

Those of ordinary skill in the art will recognize that the printing/finishing resources 140 include any resource(s) and/or material(s) utilized by a print shop to input, derive, format, generate, enhance, output, assemble, pack and/or ship hard copy output based upon a customer's electronic data. As such, printing/finishing resources 140 include pre-press, scanning, and fulfillment services and also include paper type/quality, toner type/quality, color output, black-and-white output, large format output, binding services including various front/rear cover options, tabs, digital front end (DFE) services, raster image processing (RIP) services, and the like.

In one embodiment of the present development, the printing/finishing resources 140 comprise respective different geographic print shop locations of a printing enterprise, e.g., a printing enterprise might have four separate print shops located in a city. The dynamic price offer generation process 150 monitors the backlog and utilization rates for each separate print shop overall, and/or particular printing/finishing resources 140 of each separate print shop, and determines when one of the print shops or a printing/finishing resource 140 thereof is over-utilized while other print shops or resources 140 thereof are under-utilized. In such case, the dynamic price offer generation process 150 will generate and offer to customers a reduced price for use of the under-utilized print shop(s) as compared to the over-utilized print shop(s) to increase demand for the under-utilized print shop(s) (alternatively, the dynamic price offer generation process 150 will raise prices for the over-utilized print shop(s) to decrease demand).

While particular embodiments have been described, alternatives, modifications, variations, improvements, and substantial equivalents that are or may be presently unforeseen may arise to applicants or others skilled in the art. Accordingly, the claims as filed and as they may be amended are intended to embrace all such alternatives, modifications variations, improvements, and substantial equivalents.

The invention claimed is:

1. A print job ordering process comprising:
   receiving an electronic on-line print job request comprising print job data from a customer workstation;
   accessing a dynamic price database to determine resource load data for at least one resource of a printing/finishing system;
   deriving a dynamic price for at least one dynamically-priced printing/finishing option of the printing/finishing system that differs from a default price for said at least one dynamically-priced printing/finishing option based upon said resource load data in said dynamic price database, wherein said dynamic price of said at least one dynamically-priced printing/finishing option is either: (i) less than said default price to increase customer demand for said at least one dynamically-priced printing/finishing option; or, (ii) greater than said default price to decrease customer demand for said at least one dynamically-priced printing/finishing option;
   outputting a first dynamic price offer to the customer workstation, said first dynamic price offer including both: (i) said default price for said at least one dynamically-priced printing/finishing option; and, (ii) the dynamic price for said at least one dynamically-priced printing/finishing option, such that the first dynamic price offer allows immediate comparison between said default price and the dynamic price for said at least one dynamically-priced printing/finishing option at said customer workstation;
   receiving printing/finishing input from the customer workstation indicating acceptance or denial of said first dynamic price offer, wherein said step of receiving printing/finishing input comprises receiving printing/finishing input from said customer workstation relating to use of a plurality of different printing/finishing options available from said printing/finishing system, including said at least one dynamically-priced printing/finishing option, and updating said dynamic price database so that said resource load data reflect said printing/finishing input received from said customer workstation for all of said plurality of different printing/finishing options available from said printing/finishing system;
   accessing said dynamic price database to determine job turn-around data for said printing/finishing system, wherein said job turn-around data relate to turn-around capabilities for said printing/finishing system;
   determining at least one under-utilized job turn-around option for which customer demand is low relative to at least one other job turn-around option;
   deriving a dynamic offer price for said under-utilized job turn-around option that differs from a default price for said under-utilized job turn-around option and that encourages customer selection of said under-utilized job turn-around option;
   outputting a second dynamic price offer to the customer workstation, said second dynamic price offer including both: (i) said default price for said under-utilized job turn-around option; and, (ii) the dynamic offer price for said under-utilized job turn-around option, such that the second dynamic price offer allows immediate comparison between said default price and the dynamic price of said under-utilized job turn-around option at said customer workstation;
   receiving turn-around input from the customer workstation indicating acceptance or denial of said dynamic offer price for said under-utilized turn-around option;
   fulfilling said electronic on-line print job request using said printing/finishing system in accordance with said printing/finishing input and in accordance with said turn-around input received from the customer workstation.

2. The print job ordering process as set forth in claim 1, wherein said turn-around data describe expected future downtime for said printing/finishing system.

* * * * *